(12) United States Patent
Ono et al.

(10) Patent No.: US 12,379,268 B2
(45) Date of Patent: Aug. 5, 2025

(54) STRAIN GAUGE

(71) Applicant: MINEBEA MITSUMI Inc., Nagano (JP)

(72) Inventors: Aya Ono, Nagano (JP); Toshiaki Asakawa, Nagano (JP); Atsushi Kitamura, Nagano (JP); Akiyo Yuguchi, Nagano (JP); Shinya Toda, Nagano (JP); Yosuke Ogasa, Nagano (JP); Yuta Aizawa, Nagano (JP); Iku Ishihara, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 240 days.

(21) Appl. No.: 17/906,378

(22) PCT Filed: Mar. 19, 2021

(86) PCT No.: PCT/JP2021/011309
§ 371 (c)(1),
(2) Date: Sep. 15, 2022

(87) PCT Pub. No.: WO2021/193405
PCT Pub. Date: Sep. 30, 2021

(65) Prior Publication Data
US 2023/0358623 A1  Nov. 9, 2023

(30) Foreign Application Priority Data

Mar. 24, 2020 (JP) .................................. 2020-052360
Dec. 21, 2020 (JP) .................................. 2020-211411

(51) Int. Cl.
*G01L 1/22* (2006.01)
*G01B 7/16* (2006.01)

(52) U.S. Cl.
CPC .............. *G01L 1/2287* (2013.01); *G01B 7/16* (2013.01)

(58) Field of Classification Search
CPC ........... G01B 7/16; G01B 7/20; G01L 1/2287; H05K 1/028; H05K 2201/10151
See application file for complete search history.

(56) References Cited

U.S. PATENT DOCUMENTS 4,134,096 A * 1/1979 Denes .................... H01C 17/23
338/195
5,057,964 A * 10/1991 Bender .................. H01C 7/003
338/195

(Continued)

FOREIGN PATENT DOCUMENTS

CN  105765671    7/2016
CN  107267944   10/2017

(Continued)

OTHER PUBLICATIONS

International Search Report for PCT/JP2021/011309 mailed on Jun. 1, 2021.

(Continued)

*Primary Examiner* — Kyung S Lee
(74) *Attorney, Agent, or Firm* — IPUSA, PLLC (57) ABSTRACT

A strain gauge includes a flexible substrate and a resistor formed of material including at least one of chromium or nickel, the resistor being situated above the substrate. The strain gauge includes a functional layer formed of an insulating material that has a higher thermal conductivity than the resistor, the functional layer being situated between the substrate and the resistor. The resistor includes multiple resistive patterns that are juxtaposed. The resistor includes folded portions each of which connects end portions of resistive portions that are next to each other. A first metallic (Continued)

layer formed of a material that has a higher thermal conductivity than the resistor is laminated on the folded portions.

11 Claims, 4 Drawing Sheets

(56) References Cited

U.S. PATENT DOCUMENTS

| | | | |
|---|---|---|---|
| 5,065,221 A * | 11/1991 | Imamura | H01C 17/23 338/195 |
| 5,394,019 A * | 2/1995 | Audy | H01C 17/24 338/195 |
| 5,914,168 A | 6/1999 | Wakamatsu et al. | |
| 6,532,824 B1 * | 3/2003 | Ueno | G01P 15/125 73/780 |
| 10,133,418 B2 * | 11/2018 | Smith | G06F 3/04164 |
| 10,653,013 B1 * | 5/2020 | Hwang | H01C 1/14 |
| 11,326,967 B2 * | 5/2022 | Toda | G01D 21/02 |
| 2003/0016116 A1 | 1/2003 | Blaha | |
| 2015/0030408 A1 | 1/2015 | Groche et al. | |
| 2015/0338294 A1 * | 11/2015 | Watson | H01C 17/23 73/774 |
| 2016/0358701 A1 | 12/2016 | Koda et al. | |
| 2017/0122783 A1 | 5/2017 | Xue et al. | |
| 2021/0033476 A1 | 2/2021 | Toda et al. | |

FOREIGN PATENT DOCUMENTS

| | | |
|---|---|---|
| EP | 0235329 | 9/1987 |
| EP | 725392 | 8/1996 |
| JP | S48-017777 | 3/1973 |
| JP | S59-075676 | 4/1984 |
| JP | S63-217220 | 9/1988 |
| JP | H03-191802 | 8/1991 |
| JP | H06-300649 | 10/1994 |
| JP | H07-190709 | 7/1995 |
| JP | H08-014812 | 1/1996 |
| JP | H08-102163 | 4/1996 |
| JP | H09-016941 | 1/1997 |
| JP | H09-033367 | 2/1997 |
| JP | H10-0270201 | 10/1998 |
| JP | 2007-173544 | 7/2007 |
| JP | 2015-031633 | 2/2015 |
| JP | 2015-512511 | 4/2015 |
| JP | 2016-074934 | 5/2016 |
| JP | 2016-136605 | 7/2016 |
| JP | 2017-523436 | 8/2017 |
| WO | 2019/151345 | 8/2019 |

OTHER PUBLICATIONS

Hibrids, Jul. 1, 1989, vol. 5, No. 3, pp. 2-8, Noboru Ichinose, "Development of Highly Conductive Ceramics and its Thermal Measurement", p. 3, tab. 2.
Nov. 30, 2005, pp. 400-401, "Chronological Scientific Tables 2006 (Desktop version)".
Oct. 20, 1990, vol. 4, No. 2-3, pp. 112-115, non-official translation, Ichiro Hatta, "Microelectronics and thermophysical property measurement of a thermophysical property of thin films", p. 113, table 1.
1990, vol. 41, No. 5, pp. 2-10, Takeo Oki, "Surface Hardening by Dry Process and Its Trend", Journal of the Surface Finishing Society of Japan, pp. 7-8, table 5.
International Search Report for PCT/JP2019/003228 mailed on May 7, 2019.
Office Action mailed on Dec. 2, 2021 with respect to the corresponding Chinese patent application No. 201980010674.0.
Office Action mailed on Feb. 22, 2022 with respect to the corresponding Japanese patent application No. 2018-017051.
Office Action mailed on Jan. 22, 2025 with respect to the corresponding Chinese patent application No. 202180023132.4.

* cited by examiner

STRAIN GAUGE

TECHNICAL FIELD

The present invention relates to a strain gauge.

BACKGROUND ART

A strain gauge is known to be attached to a measured object to detect strain on the measured object. The strain gauge includes a resistor for detecting strain, and as a resistor material, for example, material including Cr (chromium) or Ni (nickel) is used. The resistor is formed, for example, in a pattern with zigzagged hairpin turns (see, for example, Patent Document 1).

[Citation List]

[Patent Document]

[Patent document 1] Japanese Unexamined Patent Application Publication No. 2016-74934

SUMMARY

The strain gauge operates in response to applying a voltage from an external power source to the resistor. However, in this case, the current flows into the resistor and thus self-heating is generated by the resistor, which results in reductions in measurement accuracy of the strain gauge.

In view of the point described above, an object of the present invention is to provide a strain gauge that improves measurement accuracy.

A strain gauge includes a flexible substrate and a resistor formed of material including at least one of chromium or nickel, the resistor being situated above the substrate. The strain gauge includes a functional layer formed of an insulating material that has a higher thermal conductivity than the resistor, the functional layer being situated between the substrate and the resistor. The resistor includes multiple resistive patterns that are juxtaposed. The resistor includes folded portions each of which connects end portions of given resistive patterns that are next to each other. A first metallic layer formed of a material that has a higher thermal conductivity than the resistor is laminated on the folded portions.

Effects of the Invention

According to a disclosed technique, a strain gauge that improves measurement accuracy can be provided.

DESCRIPTION OF EMBODIMENTS

One or more embodiments will be hereinafter described with reference to the drawings. In each figure, the same numerals denote the same components, and accordingly, duplicative description may be omitted.

First Embodiment

Figure 1:
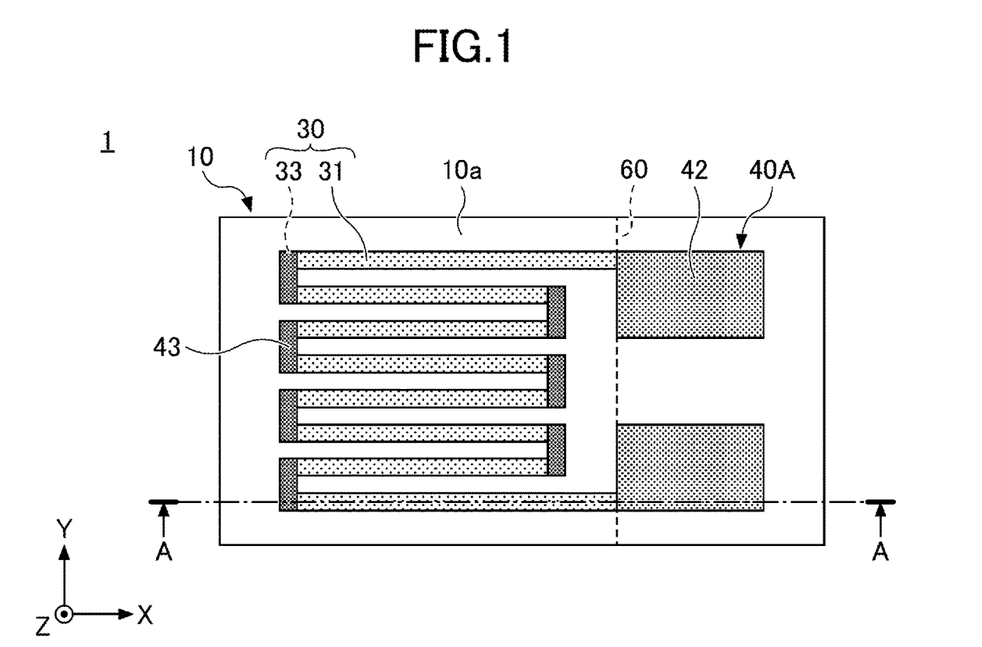
FIG. 1 is a plan view of an example of a strain gauge according to a first embodiment.
Figure 2:
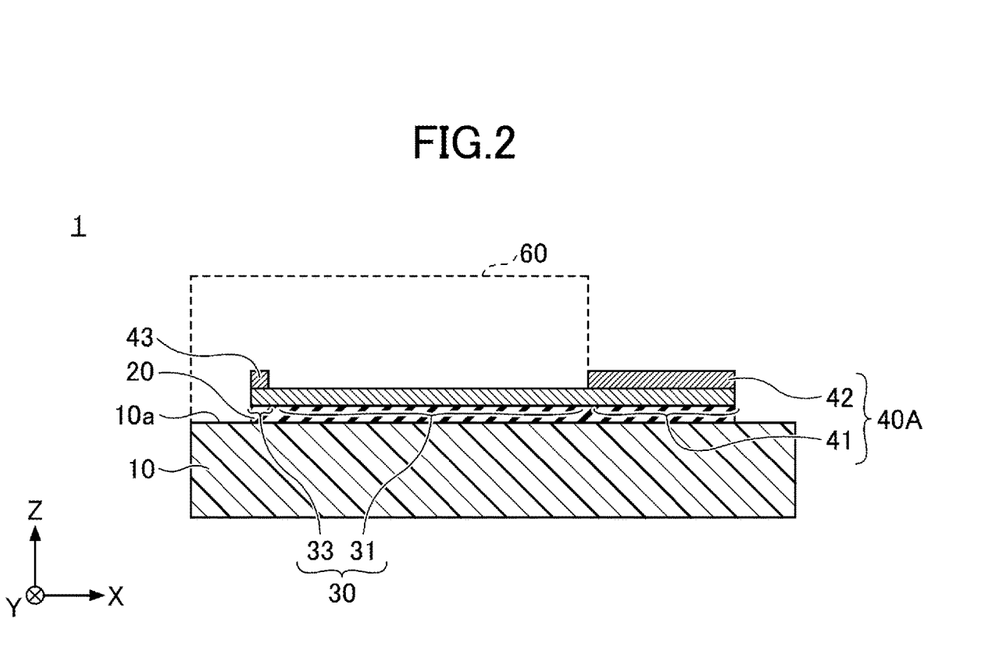
FIG. 2 is a cross-sectional view of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates the cross section taken along the A-A line in FIG. 1. Referring to FIGS. 1 and 2, a strain gauge 1 includes a substrate 10, a functional layer 20, a resistor 30, electrodes 40A, and a metallic layer 43.

In the present embodiment, for the sake of convenience, for the strain gauge 1, the side of the substrate 10 where the resistor 30 is provided is referred to as an upper side or one side, and the side of the substrate 10 where the resistor 30 is not provided is referred to as a lower side or the other side. Further, for each component, the surface on the side where the resistor 30 is provided is referred to as one surface or an upper surface, and the surface on the side where the resistor 30 is not provided is referred to as the other surface or a lower surface. However, the strain gauge 1 can be used in a state of being upside down, or can be disposed at any angle. Further, a plan view means that an object is viewed in a direction normal to an upper surface 10*a* of the substrate 10, and a planar shape refers to a shape of an object when viewed in the direction normal to the upper surface 10*a* of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like and of dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. The film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The functional layer 20 is between the substrate 10 and the resistor 30 and is formed of an insulating material having a higher thermal conductivity than the substrate 10 or resistor 30. In the present embodiment, the functional layer 20 is formed directly on the upper surface 10a of the substrate 10, and the resistor 30 is formed directly on the upper surface of the functional layer 20. A planar shape of the functional layer 20 is patterned to be substantially the same as the planar shape of the resistor 30 illustrated in FIG. 1, for example.

However, the planar shape of the functional layer 20 is not restricted when it is substantially the same as the planar shape of the resistor 30. The functional layer 20 is formed of an insulating material, and thus it is not necessary to be patterned to have the same shape as the planar shape of the resistor 30. That is, the functional layer 20 may be solidly formed to correspond to a region in which at least the resistor 30 is formed. Alternatively, the functional layer 20 may be solidly formed on the entire upper surface 10a of the substrate 10. By forming the functional layer 20 solidly, a surface area of the functional layer 20 is increased, and thus transfer performance of heat to the substrate 10 can be further enhanced.

Preferably, the thickness of the functional layer 20 is greater than or equal to 1 nm and less than or equal to 1 μm. When the thickness of the functional layer 20 is 10 nm or more, in a case where the current flows through the resistor 30 to generate heat, the heat can efficiently escape to the substrate 10. When the thickness of the functional layer 20 is 1 μm or less, cracks are less likely to be formed in the functional layer 20. From the viewpoint of further enhancing heat dissipation performance, the thickness of the functional layer 20 is preferably greater than or equal to 0.05 μm and less than or equal to 1 μm, and more preferably greater than 0.01 μm and less than or equal to 1 μm.

In the present application, the functional layer refers to a layer including a function of promoting crystal growth of the resistor 30 that is at least an upper layer, and the layer contributes to the dissipation of heat generated by the resistor 30. Also, the functional layer 20 preferably includes a function of preventing oxidation of the resistor 30 caused by oxygen and moisture contained in the substrate 10, as well as including a function of improving adhesion between the substrate 10 and the resistor 30. The functional layer 20 may further include other functions.

The insulating resin film that constitutes the substrate 10 contains oxygen and moisture. In this regard, particularly when the resistor 30 includes Cr (chromium), it is effective for the functional layer to have a function of preventing oxidation of the resistor 30, because Cr forms an autoxidized film.

When the material of the functional layer 20 has a function of promoting crystal growth of the resistor 30, which is at least an upper layer, and the material is an insulating material having a higher thermal conductivity than the resistor 30, the material of the functional layer 20 is not particularly restricted. The material of the functional layer 20 can be appropriately selected for any purpose. The functional layer 20 has a relatively thick film thickness. With this arrangement, when the functional layer 20 is formed of a conductive material, a portion of the current through the resistor 30 flows into the functional layer 20. Thus, the insulating material is selected.

As a preferable insulating material of the functional layer 20, for example, a metal compound is used. Specifically, for example, $SiO_2$, $Si_3N_4$, $TiO_2$, $Ta_2O_5$, TiN, TaN, $Cr_2O_3$, CrN, $Cr_2N$, or the like is used.

The resistor 30 is a thin film that is formed in a predetermined pattern and above the substrate 10, and is a sensitive section where the resistance varies in accordance with strain.

The resistor 30 can be formed of, for example, material including Cr (chromium), material including Ni (nickel), or material including both Cr and Ni. In other words, the resistor 30 can be formed of material including at least one of Cr or Ni. An example of the material including Cr includes a Cr composite film. An example of the material including nickel includes Cu—Ni (copper nickel). An example of the material including both Cr and Ni includes Ni—Cr (nickel chromium).

Here, the Cr composite film is a composite film of Cr, CrN, and $Cr_2N$, and the like. The Cr composite film may include incidental impurities such as chromium oxide.

The thickness of the resistor 30 is not particularly restricted and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reductions in cracks of a given film caused by internal stress of the film that constitutes the resistor 30, or of reductions in warp in the substrate 10.

With the resistor 30 being formed on the functional layer 20, the resistor 30 can be formed by a stable crystalline phase and thus stability of gauge characteristics (a gauge factor, a gauge factor temperature coefficient TCS, and a temperature coefficient of resistance TCR) can be improved.

For example, when the resistor 30 is a Cr composite film, in a case of providing the functional layer 20, the resistor 30 can be formed with α-Cr (alpha-chromium) as a main component. The α-Cr has a stable crystalline phase, and thus stability of the gauge characteristics can be improved.

Here, the main component means that a target substance is at 50% by weight or more of total substances that constitute the resistor. When the resistor 30 is the Cr composite film, the resistor 30 preferably includes α-Cr at 80% by weight or more, and more preferably at 90% by weight or more, from the viewpoint of improving the gauge characteristics. The α-Cr is Cr having a bcc structure (body-centered cubic structure).

When the resistor 30 is a Cr composite film, CrN and $Cr_2N$ included in the Cr composite film are preferably at 20% by weight or less. When CrN and $Cr_2N$ included in the Cr composite film are at 20% by weight or less, reductions in the gauge factor can be suppressed.

A percentage of $Cr_2N$ in the CrN and $Cr_2N$ is preferably greater than or equal to 80% and less than 90%, and more preferably greater than or equal to 90% and less than 95%. When the percentage of $Cr_2N$ in the CrN and $Cr_2N$ is greater than or equal to 90% and less than 95%, TCR (negative TCR) is further reduced significantly by $Cr_2N$ having a semiconductor characteristic. Further, with reductions in making of ceramics, brittle fracture is reduced.

When a trace amount of $N_2$ or atomic N, which is mixed into a given film, is present, the external environment (e.g., in a high temperature environment) causes the trace amount of $N_2$ or atomic N to escape from the given film, thereby resulting in changes in film stress. By creating chemically stable CrN, a stable strain gauge can be obtained without forming the unstable N.

The electrodes 40A respectively extend from both end portions of the resistor 30 and are each wider than the resistor 30 to be in an approximately rectangular shape, in a plan view. The electrodes 40A are a pair of electrodes for externally outputting changes in a resistance value of the resistor 30 in accordance with strain, and for example, a lead wire or the like for an external connection is joined to each electrode. For example, the resistor 30 extends from one electrode 40A, with zigzagged hairpin turns, to be connected to the other electrode 40A. The functional layer 20 is present between the electrodes 40A and the substrate 10.

Each electrode 40A has a laminated structure in which a plurality of metallic layers are laminated. Specifically, the electrodes 40A include respective terminal sections 41, which extend both end portions of the resistor 30, and include respective metallic layers 42 that are formed on the upper surfaces of the terminal sections 41. For the sake of convenience, the resistor 30 and the terminal sections 41 are indicated by different numerals. However, the resistor 30 and the terminal sections 41 can be integrally formed of the same material, in the same process.

As the material of the metallic layer 42, material having better solder wettability than the terminal sections 41 can be selected. For example, when the resistor 30 is a Cr composite film, the material of the metallic layer 42 includes Cu, Ni, Al, Ag, Au, Pt, or the like; an alloy of any metals among the above metals; a compound of any metal among the above metals; or a laminated film in which any metal among the metals, the alloy, and the compound are laminated appropriately. The thickness of the metallic layer 42 is not particularly restricted and can be appropriately selected for any purpose. For example, the thickness can be approximately between 0.01 µm and 30 µm. In consideration of dissolution of metallization, the thickness of the metallic layer 42 is preferably 1 µm or more, and more preferably 3 µm or more. When the metallic layer 42 is formed by electrolytic plating, the thickness of the metallic layer 42 is preferably 30 µm or less in terms of ease of electrolytic plating.

When solder wettability or dissolution of metallization will not become a problem, each terminal section 41 itself may be used as an electrode without laminating the metallic layer 42.

The resistor 30 includes a plurality of resistive patterns 31 that are juxtaposed such that the longitudinal direction of each resistive pattern is the same direction (in the example in FIG. 1, the X direction), and includes folded portions 33 each of which connects outer sides of end portions of respective resistive patterns 31 that are next to each other.

On each folded portion 33, the metallic layer 43, which is made of a material having a higher thermal conductivity than the substrate 10 or resistor 30, is laminated. The metallic layer 43 functions as a heat dissipation layer, and is provided on the folded portion 33. Thus, sensitivity of the strain gauge 1 is not reduced. That is, with the metallic layer 43 being provided on each folded portion 33, when the current flows through the resistor 30 to generate heat, the heat can be dissipated without reducing the sensitivity of the strain gauge 1.

In FIG. 1, each folded portion 33 of the resistor 30 is linear. However, the folded portion of the resistor 30 is not limited to being linear and may have any shape. For example, the folded portion of the resistor 30 may have a curved shape, or may have a combination of a linear portion and a curved portion.

The material of the metallic layer 43 is not particularly restricted as long as it is a material having a higher thermal conductivity than the resistor 30. The material can be appropriately selected for any purpose. For example, when the resistor 30 is a Cr composite film, the material of the metallic layer 43 includes C, Al, Si, Au, Ag, Cu, Pd, Pt, Sn, Pb, In, Ga, Ge, a transition metal, or rare earth; an alloy of any metals among the above metals; or an oxide, a nitride, or a compound of any material among these materials. Alternatively, a laminated film, in which any material of these; the alloy; the oxide; the nitride; and the compound are laminated appropriately, is used.

For example, when the resistor 30 is a Cr composite film, the thermal conductivity of Cr included in the resistor 30 is about 96.5 W/m·K. In contrast, the thermal conductivity of gold is about 319 W/m·K, the thermal conductivity of silver is about 428 W/m. K, and the thermal conductivity of copper is about 403 W/m·K. In this regard, for example, when gold, silver, or copper, as the metallic layer 43, is laminated on the folded portion 33, heat dissipation efficiency can be about three to four times more efficient in comparison to a case where the metal layer 43 is not laminated.

The thickness of the metal layer 43 can be appropriately selected in consideration of required heat dissipation performance. Such a thickness can be, for example, approximately 0.01 µm to 30 µm.

The metallic layer 43 may be formed of the same material as the metallic layer 42, in the same process as the metallic layer 42. Alternatively, the metallic layer 43 may be formed of a different material from the metallic layer 42, in a different process from the metallic layer 42. In this case, the thickness of the metallic layer 43 does not need to be the same as the thickness of the metallic layer 42. In FIG. 1, for the sake of convenience, the resistive patterns 31, the metallic layer 42, and the metallic layer 43 are each illustrated in a different crepe pattern.

A cover layer 60 (insulating resin layer) may be provided on and above the upper surface 10a of the substrate 10, such that the resistor 30 and metallic layer 43 are coated and the electrodes 40A are exposed. With the cover layer 60 being provided, mechanical damage and the like can be prevented from occurring in the resistor 30 and the metallic layer 43. Additionally, with the cover layer 60 being provided, the resistor 30 and the metallic layer 43 can be protected against moisture and the like. The cover layer 60 may be provided to cover all portions except for the electrodes 40A.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted and can be appropriately selected for any purpose. For example, the thickness may be approximately 2 µm to 30 µm.

Figure 3A:
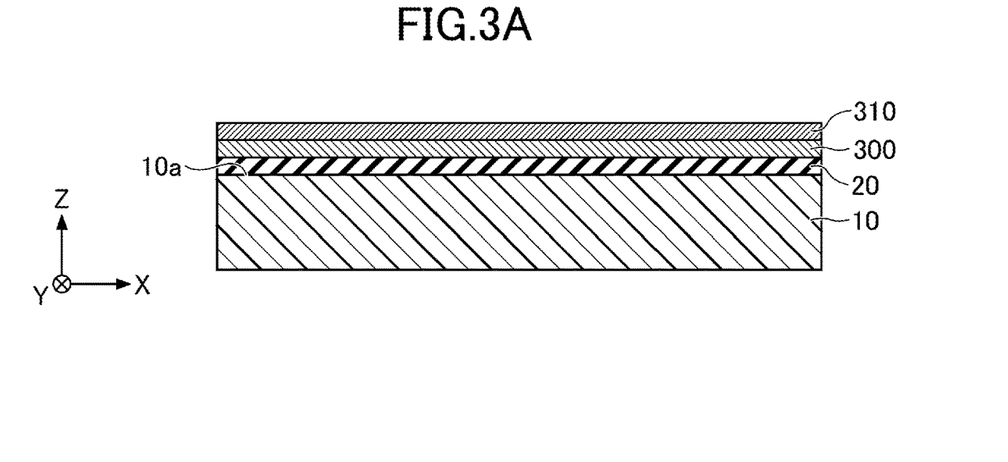
FIG. 3A is a diagram (first part) illustrating an example of a process of manufacturing the strain gauge according to the first embodiment.
Figure 3B:
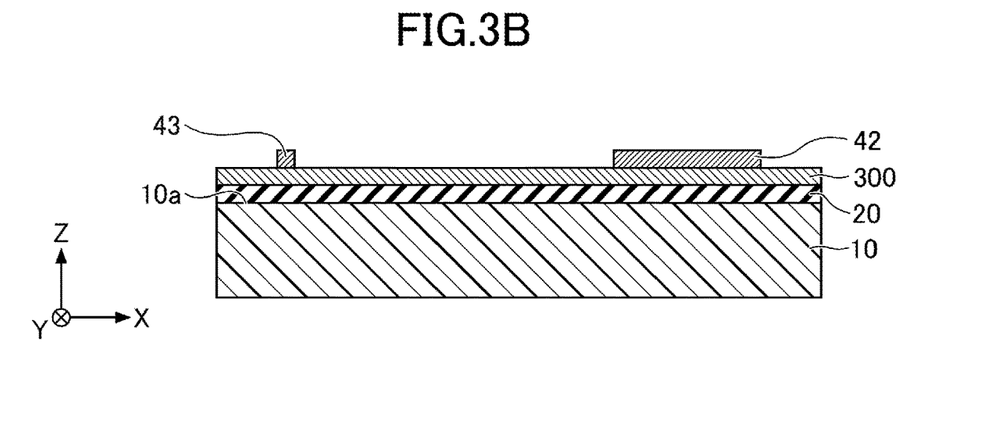
FIG. 3B is a diagram (second part) illustrating an example of the process of manufacturing the strain gauge according to the first embodiment.
Figure 3C:
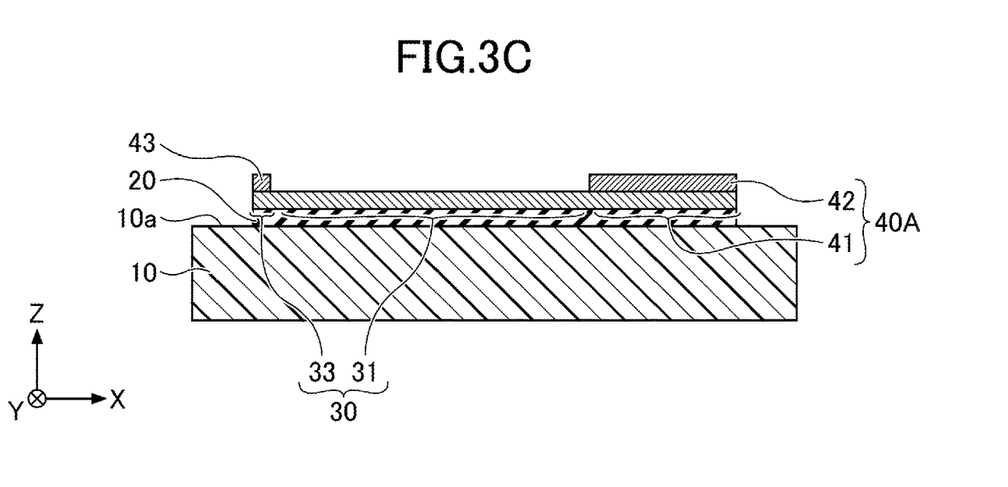
FIG. 3C is a diagram (third part) illustrating an example of the process of manufacturing the strain gauge according to the first embodiment.

FIGS. 3A to 3C are diagrams illustrating the process of manufacturing the strain gauge according to the first embodiment, and each illustrate the cross section corresponding to FIG. 2. In order to manufacture the strain gauge 1, first, in the process illustrated in FIG. 3A, the substrate 10 is prepared and then the functional layer 20, a metallic layer 300, and a metallic layer 310 are sequentially laminated on or above the upper surface 10a of the substrate 10.

The functional layer 20 can be deposited, for example, by plating, magnetron sputtering, reactive sputtering, vapor deposition, arc ion plating, pulsed laser deposition, or the like. The material and thickness of the functional layer 20 are set as described above.

The metallic layer 300 can be deposited, for example, by magnetron sputtering in which a source material capable of forming the metallic layer 300 is a target. Instead of the magnetron sputtering, the metal layer 300 may be deposited using reactive sputtering, vapor deposition, arc ion plating, pulsed laser deposition, or the like.

The metallic layer 300 is a layer that is finally patterned to become the resistor 30 and terminal sections 41. With this arrangement, the material and thickness of the metallic layer 300 are the same as the material and thickness of the above resistor 30 and terminal sections 41.

The metallic layer 310 can be deposited, for example, by magnetron sputtering in which a source material capable of forming the metallic layer 310 is a target. Instead of the magnetron sputtering, the metal layer 310 may be deposited using reactive sputtering, vapor deposition, arc ion plating, pulsed laser deposition, or the like. Preferably, plating is selected when the metal layer 310 is formed thickly.

The metallic layer 310 is a layer that is finally patterned to become metallic layers 42 and 43. With this arrangement, the material and thickness of the metal layer 310 are the same as the material and thickness of the metal layers 42 and 43 described above.

When the Cr composite film is formed as the metal layer 310, the metal layer 310 can be deposited by, for example, magnetron sputtering in which a source material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as the Ar gas, are supplied to the chamber. In this case, by changing a supplied amount of the nitrogen gas or pressure (nitrogen partial pressure) of the nitrogen gas, or by providing a heating process to adjust heating temperature, a percentage of CrN and $Cr_2N$ included in the Cr composite film, as well as a percentage of $Cr_2N$ in CrN and $Cr_2N$, can be adjusted. In such methods, a growth face of the Cr composite film is defined by the functional layer 20, and the Cr composite film that is formed with α-Cr as the main component having a stable crystalline structure can be deposited. Also, a given material that constitutes the functional layer 20 is diffused into the Cr composite film, and thus the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C.

Then, in the process illustrated in FIG. 3B, the metallic layer 310 is patterned by photolithography to form the metallic layers 42 and 43 each of which has the planar shapes as illustrated in FIG. 1. Then, in the process illustrated in FIG. 3C, the functional layer 20 and the metallic layer 300 are patterned by photolithography to form the functional layer 20, the resistor 30, and the terminal sections 41 each of which has the planar shape as illustrated in FIG. 1. With this arrangement, the metallic layer 43 is laminated on each folded portion 33 of the resistor 30. Also, the metallic layer 42 is laminated on each terminal section 41 and thus a corresponding electrode 40A is formed.

As described above, the functional layer 20 may be solidly formed to correspond to a region where at least the resistor 30 is formed. Alternatively, the functional layer 20 may be solidly formed on the entire upper surface 10a of the substrate 10. In this case, for example, the functional layer 20 is not etched, and the metallic layer 300 is sufficient to be patterned using an etchant or the like with which only the metallic layer 300 is etched.

After the process illustrated in FIG. 3C, the cover layer 60, with which the resistor 30 and the metallic layer 43 are coated and through which the electrodes 40A are exposed, is provided on and above the upper surface 10a of the substrate 10, as necessary. Thus, the strain gauge 1 is completed. For example, the cover layer 60 can be fabricated such that a thermosetting insulating resin film in a semi-cured state is laminated on the upper surface 10a of the substrate 10, such that the resistor 30 and the metallic layer 43 are coated therewith and the electrodes 40A are exposed; subsequently, heat is added and curing is performed. The cover layer 60 may be formed such that a thermosetting insulating resin that is liquid or paste-like is applied to the upper surface 10a of the substrate 10 and such that the resistor 30 and the metallic layer 43 are coated therewith and the electrodes 40A are exposed; subsequently, heat is added and curing is performed.

In the above process, the example in which the metallic layer 42 and the metallic layer 43 are formed using the same material is illustrated. However, this is one example. As described above, the metallic layer 42 and the metallic layer 43 may be each formed using a different material, in a different process. Also, the metallic layer 42 need not necessarily be provided.

As described above, when the metallic layer 43 made of a material that has a higher thermal conductivity than the resistor 30 is laminated on the folded portions 33 of the resistor 30, heat obtained when the current flows through the resistor 30 to generate the heat can be dissipated without reducing sensitivity of the strain gauge 1. Also, heat generated when the current flows through the resistor can be transferred to the substrate 10, through the functional layer 20 that is a lower layer of the resistor 30. As a result, in the strain gauge 1, reductions in measurement accuracy due to self-heating of the resistor 30 can be suppressed.

The above advantage is provided regardless of the material of the resistor 30. Such an advantage is particularly provided remarkably when the Cr composite film that includes Cr (thermal conductivity of about 96.5 W/m·K) having a relatively low thermal conductivity is used as the resistor 30.

The strain gauge 1 can be used in weighing applications. When the strain gauge 1 is used in weighing applications, it needs to conform to the standards required in creep. The standards required in creep include, for example, accuracy class C1 (hereinafter referred to as the C1 standard) specified by OIML R60, and include accuracy class C2 (hereinafter referred to as the C2 standard) specified by OIML R60.

In the C1 standard, each of a given creep amount and a given creep recovery amount requires to correspond to #0.0735% or less. In the C2 standard, each of a given creep amount and a given creep recovery amount requires to correspond to +0.0368% or less. When the strain gauge 1 is used in sensor applications, each of a given creep amount and a given creep recovery amount is specified to correspond to +0.5%.

In consideration by the inventors, a creep amount and a creep recovery amount are influenced by a viscoelasticity term for a given material that constitutes the resistor 30. That is, in a flexure element used in weighing applications, tension or compression occurs in a longitudinal direction (direction illustrated in the A-A line in FIG. 1) of the resistor 30. When the resistor 30 expands and contracts longitudinally due to tension or compression of the flexure element, a given creep amount and creep recovery amount are increased. Thus, expansion and contraction of the resistor 30 in the longitudinal direction are preferably suppressed.

When the metallic layer 43 such as Cu is laminated on the folded portions 33 of the resistor 30, a metal volume at each folded portion 33 is increased, and thus expansion and contraction of the resistor 30 in the longitudinal direction can be suppressed. As a result, a given creep amount and creep recovery amount can be reduced. Therefore, the C1 standard or C2 standard can be satisfied. An extent to which the creep amount and creep recovery amount are reduced can be adjusted based on the thickness of the metallic layer 43.

Each of the creep amount and creep recovery amount is an amount that varies over time of an elastically deformed amount (strain amount) of a given surface on which the resistor 30 is provided in the strain gauge 1. With this arrangement, each of the creep amount and creep recovery amount can be measured by monitoring a voltage, obtained due to strain, that is calculated based on the output between a pair of electrodes 40A.

First Modification of the First Embodiment

A first modification of the first embodiment illustrates an example in which the shapes of folded portions and metallic layer differ from those described in the first embodiment. In the first modification of the first embodiment, description for the same component as that described in the embodiment may be omitted.

Figure 4:
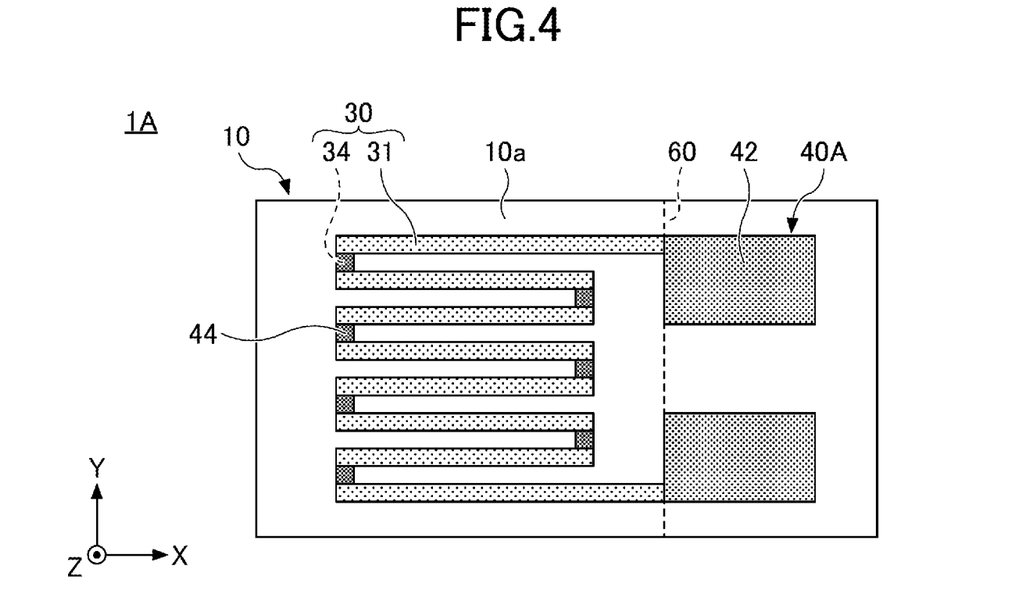
FIG. 4 is a plan view of an example of the strain gauge according to a first modification of the first embodiment.

FIG. 4 is a plan view of an example of the strain gauge according to the first modification of the first embodiment. Referring to FIG. 4, a strain gauge 1A differs from the strain gauge 1 (see FIG. 1 and the like) in that folded portions 34 are used instead of the folded portions 33 and a metallic layer 44 is used instead of the metallic layer 43.

The resistor 30 includes a plurality of resistive patterns 31 that are juxtaposed such that the longitudinal direction of each resistive pattern is the same direction (in the example in FIG. 4, the X direction), and includes the folded portions 34 each of which connects facing sides of end portions of respective resistive patterns 31 that are next to each other.

On the folded portions 34, the metallic layer 44, which is made of a material having a higher thermal conductivity than the resistor 30, is laminated. For example, the material and thickness of the metallic layer 44 can be the same as the material and thickness of the metallic layer 43.

As in the folded portion 33 illustrated in FIG. 1, a portion that connects outer sides of the end portions of respective resistive patterns 31 that are next to each other, may be regarded as a given folded portion of the resistor 30. Alternatively, as in the folded portions 34 illustrated in FIG. 4, a portion that connects facing sides of the resistive patterns 31 that are next to each other, may be regarded as a given folded portion of the resistor 30.

In either of the above cases, when a given metallic layer made of the material that has a higher thermal conductivity than the resistor 30 is laminated on folded portions of the resistor 30, heat obtained when the current flows through the resistor 30 to generate the heat can be dissipated without reducing sensitivity of the strain gauge. Also, heat obtained when the current flows through the resistor 30 can be transferred to the substrate 10 through the functional layer 20 that is a lower layer of the resistor 30. As a result, in the strain gauge, reductions in measurement accuracy due to self-heating of the resistor 30 can be suppressed.

Second Modification of the First Embodiment

A second modification of the first embodiment illustrates an example in which the position of a given metallic layer, which is disposed on folded portions, differs from that described in the first embodiment. In the second modification of the first embodiment, description for the same component as that described in the embodiments may be omitted.

Figure 5:
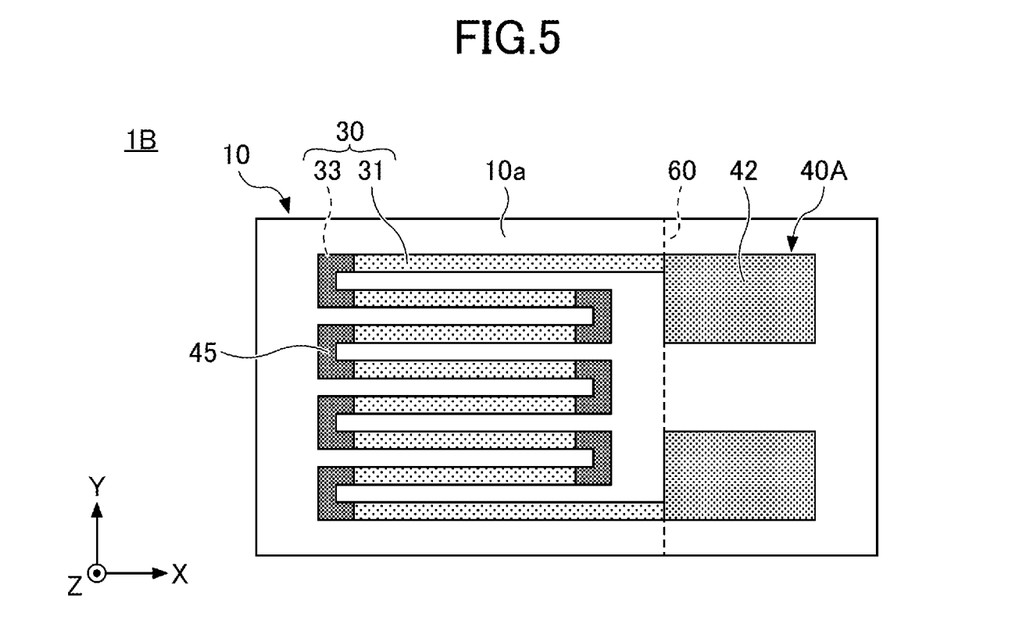
FIG. 5 is a plan view of an example of the strain gauge according to a second modification of the first embodiment.

FIG. 5 is a plan view of an example of the strain gauge according to the second modification of the first embodiment. Referring to FIG. 5, a strain gauge 1B differs from the strain gauge 1 (see FIG. 1 and the like) in that a metallic layer 45 is used instead of the metallic layer 43.

The metallic layer 45 is laminated on the folded portions 33 of the resistor 30, and further extends; from being on each folded portion 33, to being on portions of given resistive patterns 31, and thus the metallic layer 45 is formed to have a U-shape as a whole. For example, the material and thickness of the metallic layer 45 can be the same as the material and the thickness of the metallic layer 43.

As described above, the portion of the metallic layer may extend, from being on each folded portion 33, to being on the portions of given resistive patterns 31. In this case, the metallic layer 45 can be reliably laminated on the folded portions 33, even in consideration of manufacturing variations. As a result, reductions in measurement accuracy of the strain gauge 1B due to self-heating of the resistor can be suppressed more reliably.

In the strain gauge 1B, the length (length of a portion at which the metallic layer 45 is not laminated) of each resistive pattern 31 in a grid direction is slightly reduced in comparison to a case where the strain gauge 1 is used. Thus, detection sensitivity is assumed to be reduced slightly.

Third Modification of the First Embodiment

A third modification of the first embodiment illustrates an example in which the shape of a given folded portion differs from that described in the first embodiment. In the third modification of the first embodiment, description for the same component as that described in the embodiments may be omitted.

Figure 6:
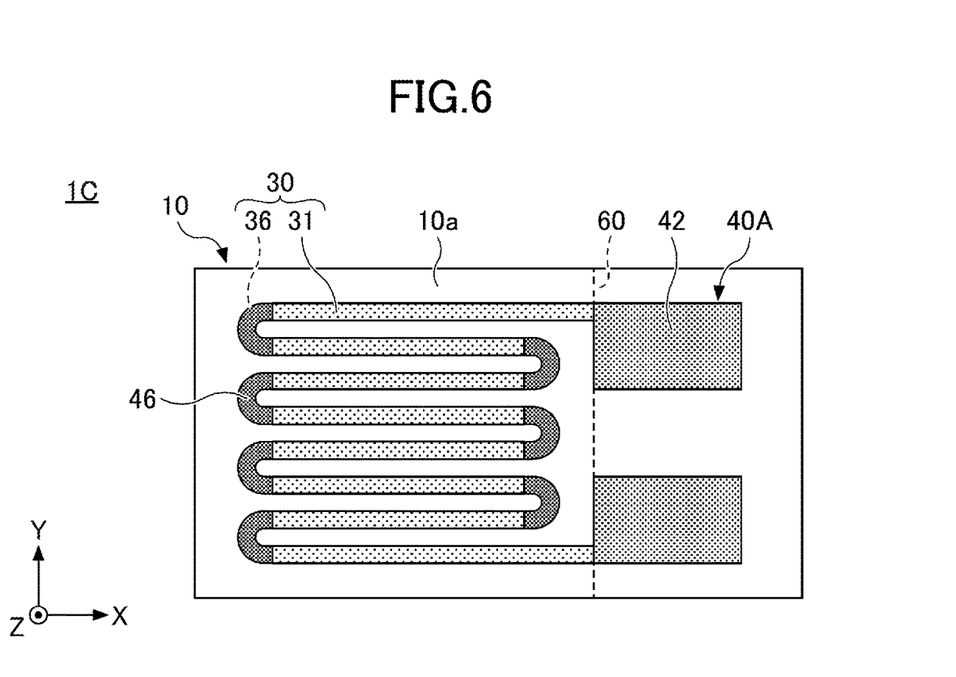
FIG. 6 is a plan view of an example of the strain gauge according to a third modification of the first embodiment.

FIG. 6 is a plan view of the strain gauge according to the third modification of the first embodiment. Referring to FIG. 6, a strain gauge 1C differs from the strain gauge 1 (see FIG. 1 and the like) in that folded portions 36 are used instead of the folded portions 33 and a metallic layer 46 is used instead of the metallic layer 43.

The resistor 30 includes a plurality of resistive patterns 31 that are juxtaposed such that the longitudinal direction of each resistive pattern is the same direction (in the example in FIG. 6, the X direction), and includes folded portions 36 each of which connects outer ends of the end portions of respective resistive patterns 31 that are next to each other.

The metallic layer 46, which is made of a material having a higher thermal conductivity than the resistor 30, is laminated on the folded portions 36. For example, the material and thickness of the metallic layer 46 can be the same as the material and thickness of the metallic layer 43.

Each folded portion 36 is formed to have a curved shape (e.g., U-shape), which differs from the folded portion 33 (see FIG. 1). In this case as well, when the metallic layer 46, which is made of a material having a higher thermal conductivity than the resistor 30, is laminated on the folded portions 36 of the resistor 30, heat obtained when the current flows through the resistor 30 to generate the heat can be dissipated without reducing sensitivity of the strain gauge 1C. Also, heat obtained when the current flows through the resistor 30 can be transferred to the substrate 10 through the functional layer 20 that is a lower layer of the resistor 30. As a result, in the strain gauge 1C, reductions in measurement accuracy due to self-heating of the resistor 30 can be suppressed.

In the strain gauge 1C, a portion of the metallic layer 46 may extend, from being on each folded portion 36, to being on portions of given resistive patterns 31, as in the strain gauge 1B. In this case, the metallic layer 46 can be reliably laminated on the folded portions 36, even in consideration of manufacturing variations. As a result, reductions in measurement accuracy of the strain gauge 1C due to self-heating of the resistor 30 can be suppressed more reliably. The length (length of a portion at which the metallic layer 46 is not laminated) of each resistive pattern 31 in the grid direction becomes slightly shorter. Thus, detection sensitivity is assumed to be reduced slightly.

Fourth Modification of the First Embodiment

A fourth modification of the first embodiment illustrates an example in which a second functional layer is provided underneath the functional layer 20. In the fourth modification of the first embodiment, description for the same component as that described in the embodiments may be omitted.

Figure 7:
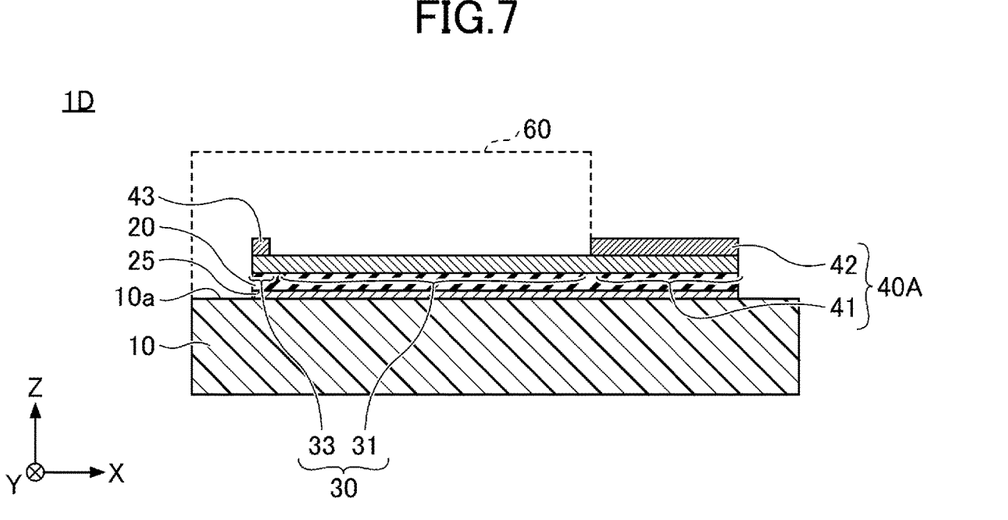
FIG. 7 is a plan view of an example of the strain gauge according to a fourth modification of the first embodiment.

FIG. 7 is a cross-sectional view of the strain gauge according to the fourth modification of the first embodiment. Referring to FIG. 7, a strain gauge 1D differs from the strain gauge 1 (see FIG. 2 and the like) in that a second functional layer 25 is provided between the substrate 10 and the functional layer 20.

The second functional layer 25 is between the substrate 10 and the functional layer 20 and is formed of a metal or alloy that has a higher thermal conductivity than the resistor 30. In the present embodiment, the second functional layer 25 is formed directly on the upper surface 10a of the substrate 10, the functional layer 20 is formed directly on the upper surface of the second functional layer 25, and the resistor 30 is formed directly on the upper surface of the functional layer 20. The planar shape of the second functional layer 25 is substantially the same as the planar shape of each of the functional layer 20 and the resistor 30 as illustrated in FIG. 1.

The thickness of the second functional layer 25 can be, for example, greater than or equal to 1 nm and less than or equal to 1 μm. When the thickness of the second functional layer 25 is 1 nm or more, adhesion between the substrate 10 and the functional layer 20 can be sufficiently improved. When the thickness of the second functional layer 25 is 10 nm or more, in a case where the current flows through the resistor 30 to generate heat, the heat can efficiently escape to the substrate 10. When the thickness of the second functional layer 25 is 1 μm or less, cracks are less likely to be formed in the second functional layer 25. From the viewpoint of further enhancing heat dissipation performance, the thickness of the second functional layer 25 is preferably greater than or equal to 0.01 μm and less than or equal to 1 μm, and more preferably greater than or equal to 0.05 μm and less than or equal to 1 μm.

The second functional layer is a layer that contributes to the dissipation of heat generated by at least the resistor 30, and the layer includes a function of improving adhesion between the substrate and the functional layer 20. The second functional layer 25 may further include a function of preventing oxidation of the resistor 30 caused by oxygen or moisture contained in the substrate 10, as well as including any other function.

The material of the second functional layer 25 is not particularly restricted, as long as that material contributes to the dissipation of heat generated by at least the resistor 30, and also includes a function of improving adhesion between the substrate and the functional layer 20. Such a material can be appropriately selected for any purpose. An example of the material of the second functional layer 25 includes one or more metals selected from among the group consisting of Cr (chromium), Ti (titanium), V (vanadium), Nb (niobium), Ta (tantalum), Ni (nickel), Y (yttrium), Zr (zirconium), Hf (hafnium), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), or includes an alloy of any metals among the group.

An example of the alloy include FeCr, TiAl, FeNi, NiCr, CrCu, or the like. An example of a compound includes TiN, TaN, $Si_3NA$, $TiO_2$, $Ta_2O_5$, $SiO_2$, or the like.

For example, the second functional layer 25 can be vacuum-deposited by conventional sputtering in which a source material capable of forming the second functional layer 25 is the target and in which an Ar (argon) gas is supplied to a chamber. By using the conventional sputtering, the second functional layer is formed while etching of the upper surface 10a of the substrate 10 with Ar. With this arrangement, an effect of improving the adhesion can be obtained while minimizing a deposited amount of the second functional layer 25.

However, this is one example of a method of forming the second functional layer 25, and the second functional layer 25 may be formed by any other method. In such a method, for example, before the forming of the second functional layer 25, the upper surface 10a of the substrate 10 is activated by plasma treatment or the like using Ar or the like to obtain the effect of improving the adhesion, and subsequently, the second functional layer 25 may be vacuum-deposited by magnetron sputtering.

In the strain gauge 1D, heat obtained when the current flows through the resistor 30 to generate the heat can be transferred to the substrate 10 through the functional layer 20 and second functional layer that are lower layers of the resistor 30. As a result, in the strain gauge 1D, in addition to the effect obtained in a case where the metallic layer 43 is provided, reductions in measurement accuracy due to self-heating of the resistor 30 can be suppressed.

With the second functional layer 25 being provided at a lower layer of the functional layer 20, adhesion between the substrate 10 and the functional layer 20 can be improved.

In the above description, the planar shape of the second functional layer 25 is substantially the same as the planar shape of the resistor 30. However, the planar shape is not limited to the above example. The functional layer 20 made of an insulating material is present between the second functional layer 25 and the resistor 30. With this arrangement, the second functional layer 25 and the functional layer 20 may not be each patterned to have the same shape as the planar shape of the resistor 30. That is, each of the second functional layer 25 and the functional layer may be formed solidly to correspond to a region where at least the resistor 30 is formed. Alternatively, each of the second functional layer 25 and the functional layer 20 may be formed solidly on and above the entire upper surface 10a of the substrate 10. When the second functional layer 25 and the functional layer 20 are formed solidly, the surface area of each of the second functional layer and the functional layer 20 are increased. Thus, transfer performance of heat to the substrate 10 can be further enhanced.

Although the preferred embodiment and the like have been described above in detail, these embodiments and the like are not limiting. Various modifications and alternatives to the above embodiment and the like can be made without departing from a scope set forth in the claims.

This International application claims priority to Japanese Patent Application Nos. 2020-052360, filed Mar. 24, 2020, and 2020-211411, filed Dec. 21, 2020, the contents of which are incorporated herein by reference in their entirety.

REFERENCE SIGNS LIST

1, 1A, 1B, 1C, 1D strain gauge, 10 substrate, 10*a* upper surface, 20 functional layer, 25 second functional layer, 30 resistor, 31 resistive pattern, 33, 34, 36 folded portion, 40A electrode, 41 terminal section, 42, 43, 44, 45, 46 metallic layer, 60 cover layer

The invention claimed is:

1. A strain gauge comprising:
   a flexible substrate;
   a resistor formed of material including at least one of chromium or nickel, the resistor being situated above the substrate; and
   a functional layer formed of an insulating material having a higher thermal conductivity than the resistor, the functional layer being situated between the substrate and the resistor,
   wherein the resistor includes
      multiple resistive patterns that are juxtaposed, and
      folded portions each of which connects end portions of resistive portions that are next to each other,
   wherein a first metallic layer formed of a material that has a higher thermal conductivity than the resistor is laminated on the folded portions, and
   wherein each of the multiple resistive patterns has an upper surface that extends outside the first metallic layer.

2. The strain gauge according to claim 1, wherein the first metallic layer extends from each folded portion to portions of given resistive patterns among the multiple resistive patterns.

3. The strain gauge according to claim 1, further comprising an electrode electrically coupled to the resistor,
   wherein the electrode includes
      a terminal section extending from an end portion of the resistor, and
      a second metallic layer formed on the terminal section, and
   wherein the first metallic layer and the second metallic layer are formed of a same material.

4. The strain gauge according to claim 1, wherein a thickness of the functional layer is greater than or equal to 1 nm and less than or equal to 1 μm.

5. The strain gauge according to claim 1, further comprising a second functional layer formed of a metal or an alloy that has a higher thermal conductivity than the resistor, the second functional layer being situated between the substrate and the functional layer.

6. The strain gauge according to claim 5, wherein the second functional layer includes a function of improving adhesion between the substrate and the functional layer.

7. The strain gauge according to claim 1, wherein the resistor is formed of a film that includes Cr, CrN, and $Cr_2N$.

8. The strain gauge according to claim 7, wherein CrN and $Cr_2N$ included in the resistor are at 20% by weight or less.

9. The strain gauge according to claim 8, wherein a percentage of $Cr_2N$ in the CrN and $Cr_2N$ is greater than or equal to 80% and less than 90%.

10. The strain gauge according to claim 1, wherein the first metallic layer includes a U-shaped layer portion.

11. The strain gauge according to claim 1, wherein each of the folded portions and the first metallic layer includes a curved portion.

* * * * *